United States Patent [19]

Li et al.

[11] Patent Number: 5,574,896
[45] Date of Patent: Nov. 12, 1996

[54] FRAMING CIRCUIT THAT INCREASES THE PULSE WIDTH OF THE BYTE CLOCK SIGNAL AFTER THE BYTE CLOCK SIGNAL IS RESET

[75] Inventors: Gabriel M. Li, San Francisco; Hee Wong, San Jose, both of Calif.

[73] Assignee: National Semiconductor Corporation, Santa Clara, Calif.

[21] Appl. No.: 608,101

[22] Filed: Feb. 28, 1996

Related U.S. Application Data

[63] Continuation of Ser. No. 334,682, Nov. 4, 1994, abandoned.

[51] Int. Cl.⁶ .................................................. H04L 7/00
[52] U.S. Cl. ................. 395/555; 375/368; 377/75; 364/939.5; 364/926.1; 364/926.5; 364/DIG. 2
[58] Field of Search ........................ 395/550; 375/375, 375/368; 328/37; 341/100; 369/32; 340/347; 377/75; 364/DIG. 2

[56] References Cited

U.S. PATENT DOCUMENTS

| | | | |
|---|---|---|---|
| 4,284,953 | 8/1981 | Hepworth et al. | 328/37 |
| 4,605,921 | 8/1986 | Riddle et al. | 340/347 |
| 4,765,652 | 6/1987 | Machado | 340/347 |
| 4,835,768 | 5/1989 | Hubbard et al. | 370/106 |
| 4,885,583 | 12/1989 | McCambridge | 341/100 |
| 5,081,654 | 1/1992 | Stephenson et al. | 375/106 |
| 5,289,439 | 2/1994 | Kouloupoulos et al. | 369/32 |

OTHER PUBLICATIONS

National Semiconductor Fiber Distributed Data Interface (FDDI) Databook, 1994, pp. (1–39)–(1–41).
Preliminary Data Sheet: Am79865/Am79866 Physical Data Transmitter/Physical Data Receiver, Advanced Micro Devices.

*Primary Examiner*—Kevin A. Kriess
*Assistant Examiner*—Majid A. Banankhah
*Attorney, Agent, or Firm*—Limbach & Limbach L.L.P.

[57] ABSTRACT

A framing circuit, which frames bytes of data received from a serial data bit stream, prevents a short byte clock pulse from being formed when the byte clock signal, which identifies the beginning of each frame, is reset. The framing circuit utilizes a comparison stage to output a match signal each time an n-bit data bit pattern matches a programmable predetermined framing pattern, and to delay each n-bit pattern a delay time. The framing circuit also utilizes a counter to produce the byte clock signal, and a delay circuit to freeze the output of the counter for a predetermined delay time each time the match signal is output. The delay circuit also resets the byte clock signal so that the reset byte clock signal coincides with the output of the delayed data bit pattern. By freezing the output of the counter for a predetermined time, the width of the resulting pulse is lengthened.

7 Claims, 5 Drawing Sheets

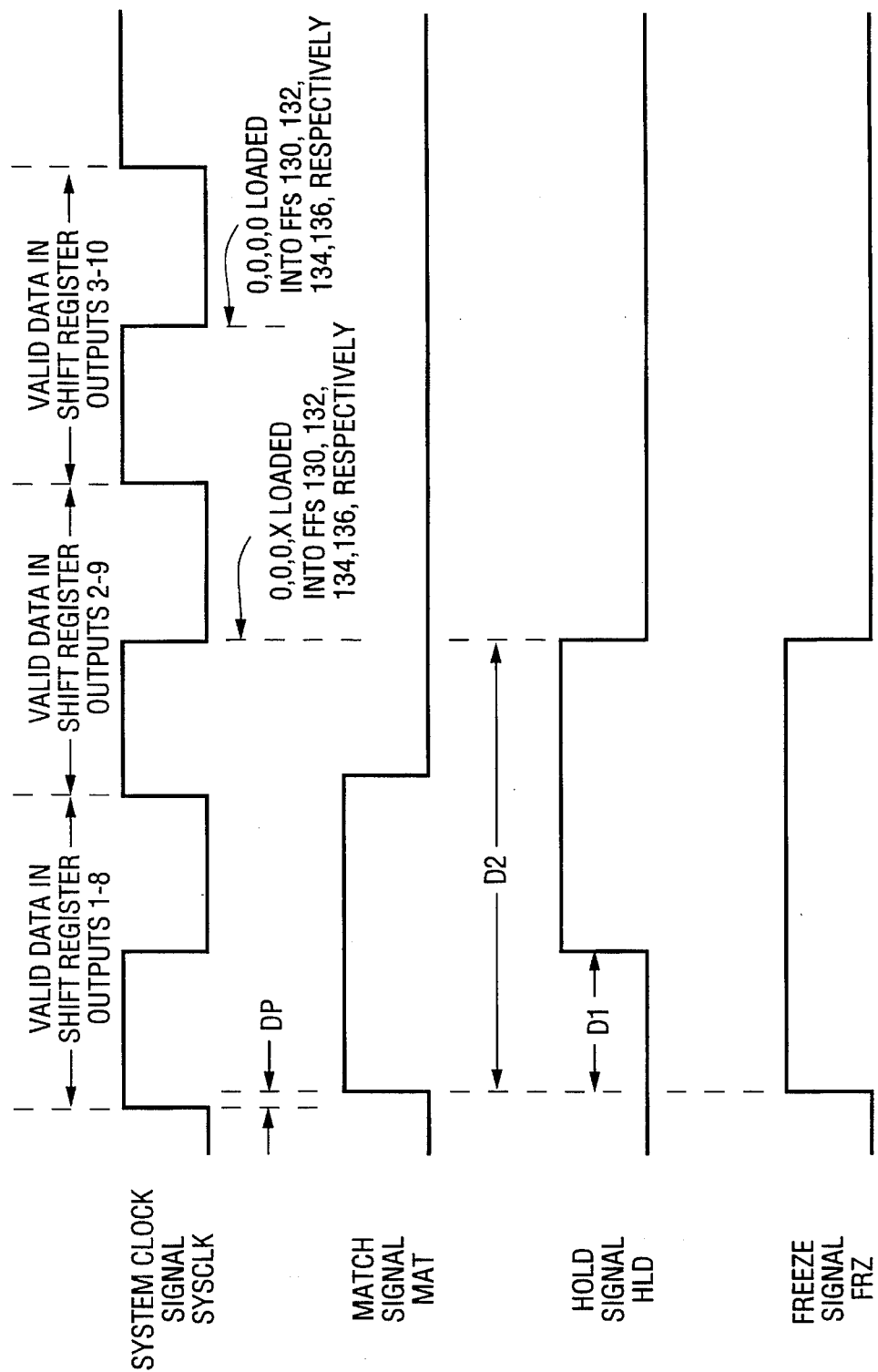

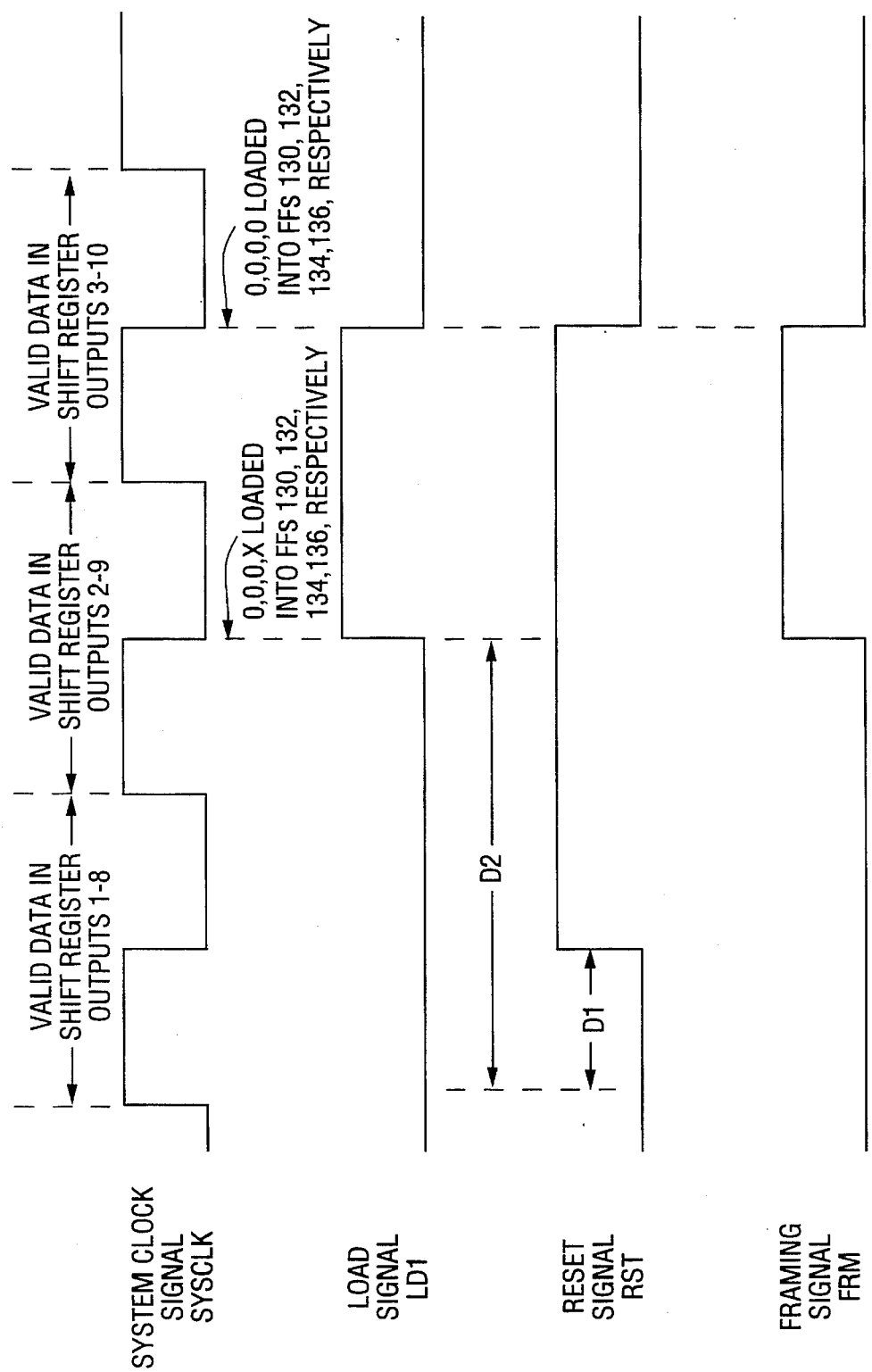

5,574,896

FRAMING CIRCUIT THAT INCREASES THE PULSE WIDTH OF THE BYTE CLOCK SIGNAL AFTER THE BYTE CLOCK SIGNAL IS RESET

This is a continuation of application Ser. No. 08/334,682 filed on Nov. 4, 1994 now abandoned.

BACKGROUND OF THE INVENTION

1. Field of the Invention

The present invention relates to a framing circuit and, in particular, to a framing circuit that removes an undesirably narrow clock pulse that results from an asynchronous frame boundary realignment.

2. Discussion of the Related Art

A framing circuit is a circuit that converts the data in a serial data bit stream into a series of parallel data words by continuously identifying n-bit framing bytes within the serial data bit stream, and then latching each successive frame of n-bits that follow the framing byte. In a conventional framing circuit, the framing byte is utilized to reset a byte clock signal which, in turn, is utilized in the remainder of the circuit to identify the beginning of each frame of data.

FIG. 1 shows a block diagram that illustrates a conventional framing circuit 10. As shown in FIG. 1, framing circuit 10 utilizes a standard shift register 12 to extract a series of n-bit data bit patterns PAT from the serial data bit stream, and a comparator 14 to compare each n-bit data bit pattern PAT to a predefined data bit pattern. In addition, framing circuit 10 also utilizes a clocking circuit 16 to output a byte clock signal BCLK, and a latch 18 to hold the parallel data words output from shift register 12.

In operation, shift register 12 outputs a continuous stream of n-bit data bit patterns PAT in response to a system clock signal SYSCLK. Comparator 14 receives each of these n-bit data bit patterns PAT and compares each pattern PAT with the predefined data bit pattern. When one of the n-bit data bit patterns PAT matches the predefined data bit pattern, comparator 14 outputs a framing signal FRM which indicates that a framing byte has been identified.

The framing signal FRM is utilized by clocking circuit 16 to reset the byte clock signal BCLK which, in turn, realigns the byte clock signal BCLK with the leading edge of the framing byte. As a result of this realignment, each subsequent frame of data can be identified by the byte clock signal BCLK. Thus, as shown in FIG. 1, the byte clock signal BCLK can be utilized by latch 18 to latch each subsequent frame of data output by shift register 12.

One problem with conventional framing circuits, however, is that each time the byte clock signal is reset to a first logic state immediately after transitioning to a second logic state, the pulse width of the byte clock signal is significantly reduced. This short pulse clock signal, in turn, can cause metastable conditions in the devices which utilize the byte clock signal.

As a result, there is a need for a framing circuit which will not produce a short pulse clock signal when the byte clock signal is reset to a first logic state immediately after transitioning to a second logic state.

SUMMARY OF THE INVENTION

In a framing circuit, a properly aligned byte clock signal is utilized to frame bytes of data received from a serial data bit stream. When the byte clock signal is reset to a first logic state immediately after transitioning to a second logic state, a short byte clock pulse is produced which can cause metastable conditions to arise in devices which utilize the byte clock signal to identify the beginning of each frame of data. The present invention lengthens the byte clock pulse that results when the byte clock signal is immediately reset, thereby eliminating these metastable conditions.

A framing circuit in accordance with the present invention includes a comparison stage that extracts a plurality of n-bit data bit patterns from the serial data bit stream in response to a system clock signal. The comparison stage compares each extracted n-bit data bit pattern with a predefined data bit pattern and, each time an extracted n-bit data bit pattern matches the predefined data bit pattern, outputs a match signal. The comparison stage also outputs the n-bit data bit pattern that matches the predefined data bit pattern as a matched data bit pattern a delay time after the match signal is output. The framing circuit of the present invention also includes a clock stage and a delay stage. The clock stage outputs a byte clock signal in response to the system clock signal. The delay stage resets the byte clock signal in response to the match signal so that the byte clock signal is reset during a time that the matched data bit pattern is output from the comparison stage.

A better understanding of the features and advantages of the present invention will be obtained by reference to the following detailed description and accompanying drawings which set forth an illustrative embodiment in which the principals of the invention are utilized.

BRIEF DESCRIPTION OF THE DRAWINGS

FIGS. 4A–4H are timing diagrams illustrating the operation of framing circuit 110 when one of the input data bit patterns matches the fixed data bit pattern.

DETAILED DESCRIPTION

Figure 1:
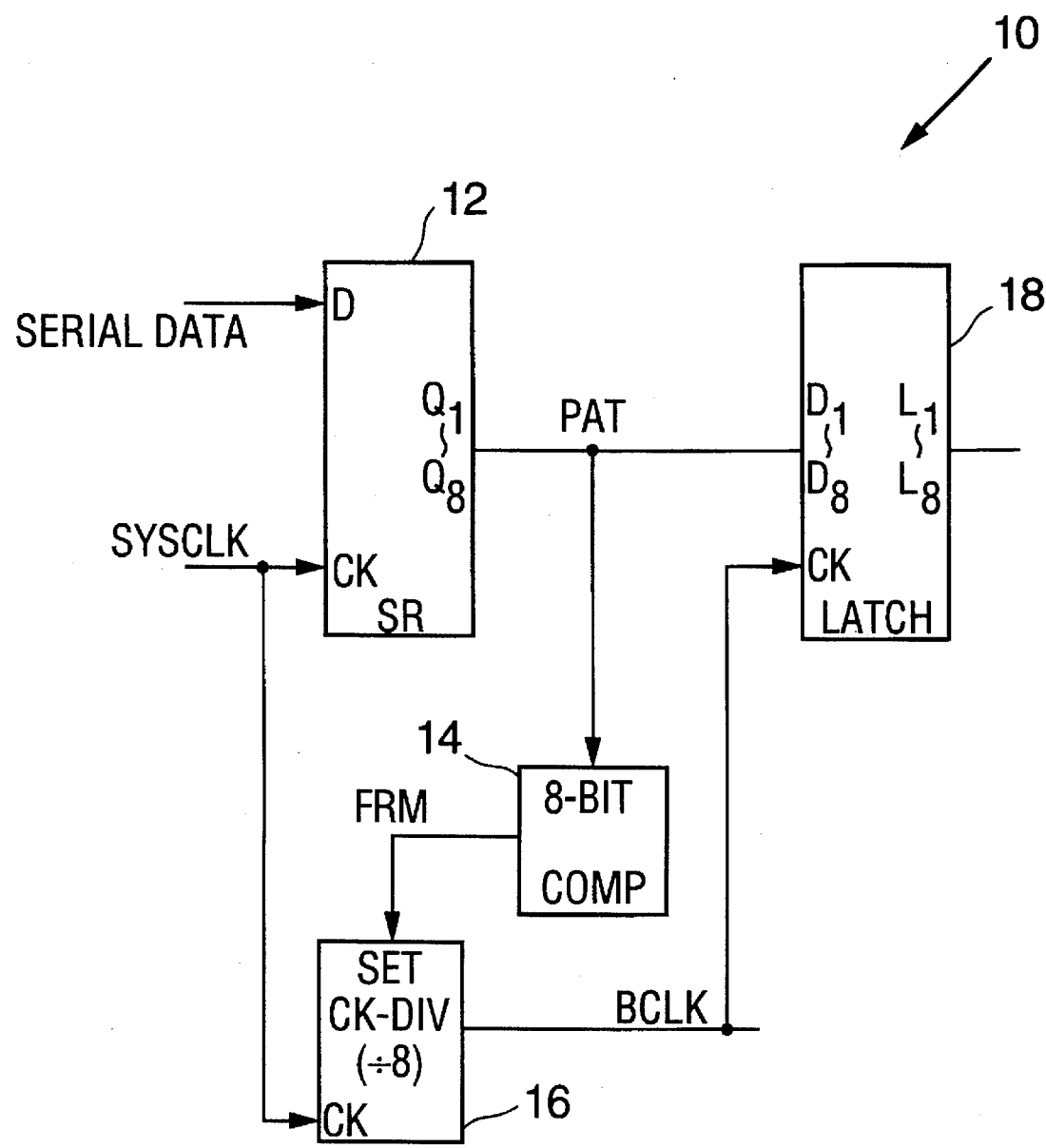
FIG. 1 is a block diagram illustrating a conventional framing circuit 10.
Figure 2:
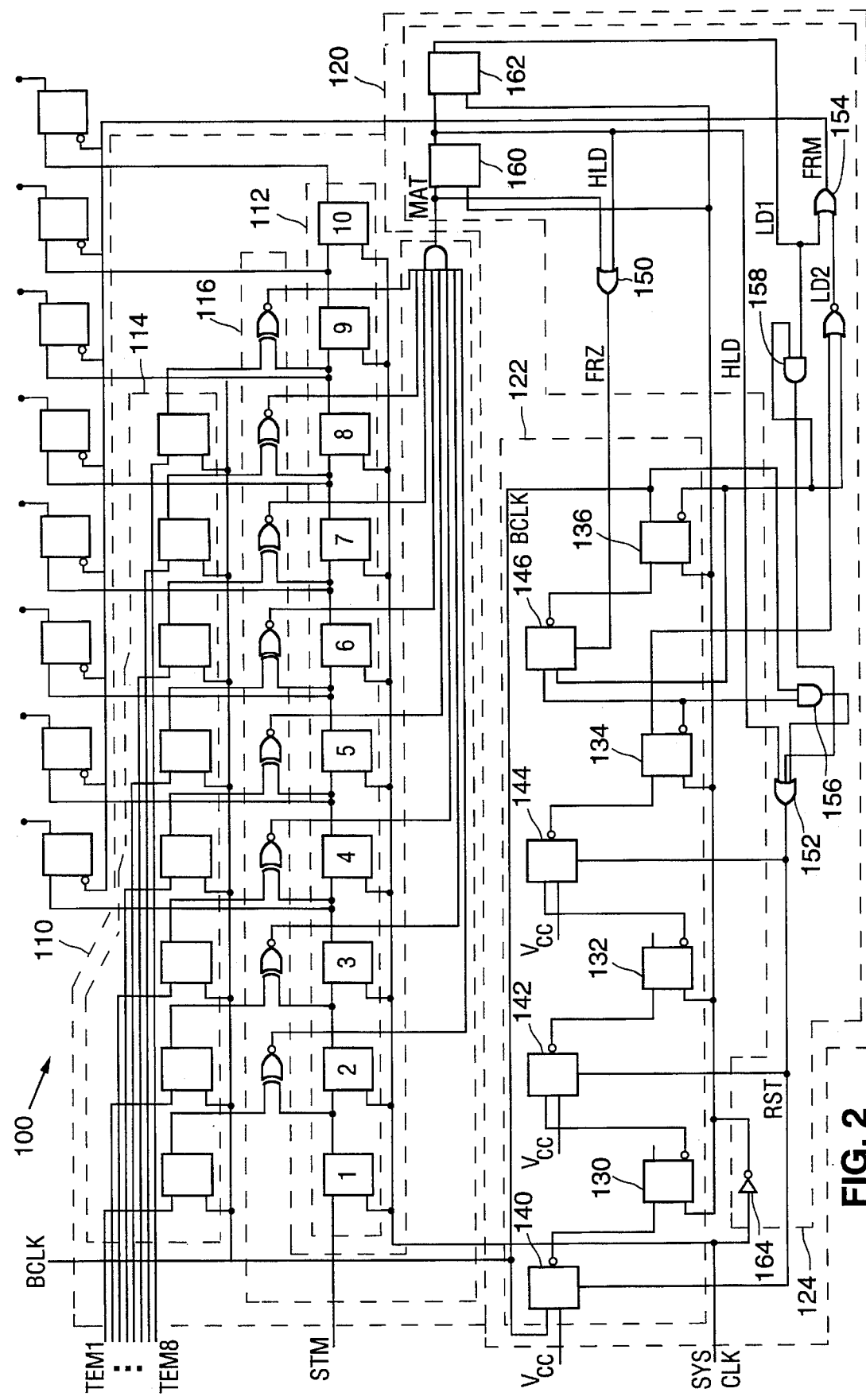
FIG. 2 is a block diagram illustrating a framing circuit 100 in accordance with the present invention.

FIG. 2 shows a block diagram that illustrates a framing circuit 100 in accordance with the present invention. As described in greater detail below, framing circuit 100 prevents a short byte clock pulse from being formed when the byte clock signal is reset by utilizing a counter to produce the byte clock signal, and a delay circuit to freeze the output of the counter for a predetermined delay time each time the byte clock signal is reset. By freezing the output of the counter for a predetermined time, the width of the resulting pulse is lengthened.

As shown in FIG. 2, framing circuit 100 includes a comparison stage 110 that identifies the data bit patterns in a serial data bit stream STM that match a fixed data bit pattern. The matching data bit patterns are identified by extracting a series of input data bit patterns from the serial data bit stream STM, comparing each extracted input data bit pattern to the fixed data bit pattern, and outputting a matched signal MAT each time one of the extracted input data bit patterns matches the fixed data bit pattern.

In the preferred embodiment of the present invention, comparison stage 110 utilizes a ten-bit shift register 112 to extract a series of eight-bit input data bit patterns from the serial data bit stream STM, and an eight-bit template 114 to output the fixed data bit pattern. Shift register 112, which is implemented in FIG. 2 with ten serially-connected flip-flops, extracts each of the input data bit patterns by sequentially shifting the logic state of each bit in the input serial data bit stream into each of the flip-flops in response to a system clock signal SYSCLK. The series of input data bit patterns are then extracted by taking the first eight outputs of the flip-flops in parallel. The significance of the remaining two outputs will be described below.

on the other hand, template 114, which is implemented in FIG. 2 with eight parallel flip-flops, forms the fixed data bit pattern by latching the logic states of eight template signals TEM1–TEM8. As a result, template 114 can be programmed to output any fixed data bit pattern by simply changing the logic states of the template signals TEM1–TEM8.

Comparison stage 110 also utilizes an eight-bit comparator 116 to compare each extracted input data bit pattern to the fixed data bit pattern, and to output the matched signal MAT each time one of the extracted input data bit patterns matches the fixed data bit pattern. As shown in FIG. 2, comparator 116 includes eight exclusive NOR gates, which compare the logic states of the first eight outputs of ten-bit shift register 112 to the logic states of the eight-bit fixed data bit pattern, and a logical AND gate, which outputs the matched signal MAT each time all of the exclusive NOR gates output a logic high.

As a result, comparator 116 only issues the matched signal MAT when an extracted input data bit pattern matches the fixed data bit pattern. Although comparator 116 has been described in terms of eight exclusive NOR gates and an AND gate, other logic circuits which produce the same result can alternately be utilized. Similarly, although the present invention has been described in terms of an eight-bit template and a ten-bit shift register, templates and shift registers of other sizes can also be utilized within the spirit of this invention.

Referring again to FIG. 2, framing circuit 100 also includes a clock stage 120 that utilizes the input data bit patterns which match the fixed data bit patterns to identify or frame each of a series of bytes of data within the serial data bit stream STM. The series of bytes of data are framed by outputting a byte clock signal BCLK which has a period equal to eight serial data bit times, and by aligning the byte clock signal BCLK to the matching input data bit patterns.

To establish and maintain alignment, the byte clock signal BCLK is reset each time one of the input data bit patterns matches the fixed data bit pattern. In accordance with the present invention, clock stage 120 prevents short byte clock pulses from forming by freezing the byte clock signal BCLK a predetermined delay time each time the byte clock signal BCLK is reset.

In the preferred embodiment, clock stage 120 utilizes a four-position Johnson counter 122 to output the byte clock signal BCLK. Counter 122, which is implemented in FIG. 2 with a series of flip-flops 130, 132, 134, and 136, and a corresponding series of multiplexers 140, 142, 144, and 146, respectively, generates the byte clock signal BCLK by incrementing a count in response to the system clock signal SYSCLK, and by taking the output of flip-flop 136.

Figure 3:
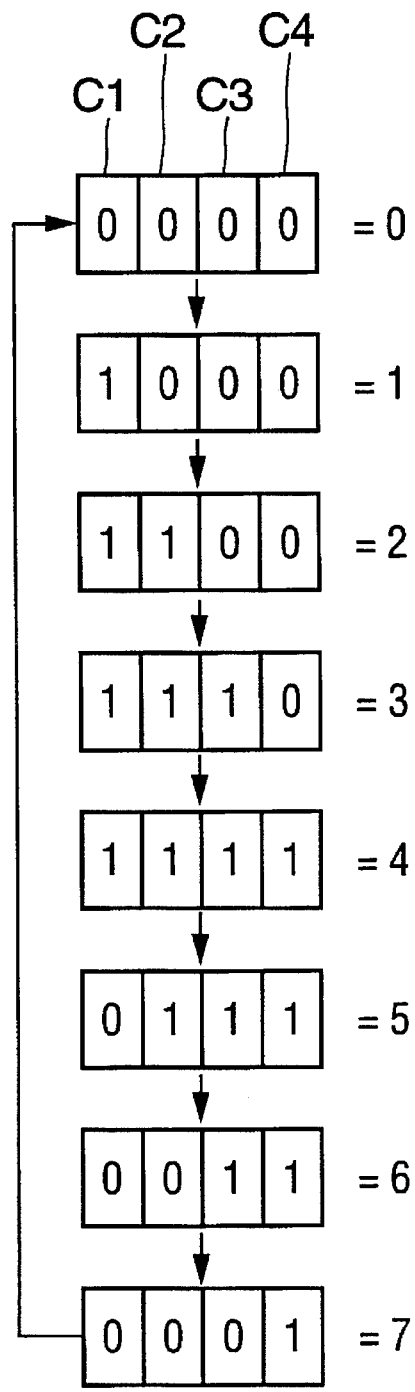
FIG. 3 is a graphical representation illustrating the counting sequence of a Johnson counter ranging from zero to seven.

FIG. 3 shows a graphical representation that illustrates the operation of a Johnson counter ranging from zero to seven. In the FIG. 3 illustration, flip-flops 130, 132, 134, and 136 are represented by counting positions C1, C2, C3, and C4, respectively. As shown in FIG. 3, in a Johnson counting sequence, the logic state of one counting position is sequentially changed each time the count is incremented by one. Thus, each counting position within a Johnson counting sequence is represented as a logic low when the count is zero. As the count incrementally increases from zero to four, the logic state of counting positions C1–C4 are sequentially changed one position at a time until each of the counting positions C1–C4 is represented as a logic high.

As the count increases from five to seven to zero, the Johnson counting sequence continues by sequentially changing the logic states of memory cells C1–C4 one counting position at a time until each of the counting positions C1–C4 is again represented as a logic low.

Thus, referring back to FIG. 2, when the inputs to flip-flops 130, 132, 134, and 136 are set to a logic low, counter 122 responds to a falling edge of the system clock signal SYSCLK by outputting logic lows at the non-inverting outputs of flip-flops 130, 132, 134, and 136. As shown in FIG. 3, these outputs represent a count of zero.

Counter 122 also responds to the falling edge of the system clock signal SYSCLK by outputting logic highs at the inverting outputs of flip-flops 130, 132, 134, and 136. The logic highs at the inverting outputs of flip-flops 130, 132, and 134 are inverted by multiplexers 142, 144, and 146, respectively, to present logic lows to the inputs of flip-flops 132, 134, and 136, respectively.

The logic low at the non-inverting output of flip-flop 136, however, is inverted to a logic high by multiplexer 140. As a result, multiplexer 140 presents a logic high to the input of flip-flop 130. Counter 122 responds to the next falling edge of the system clock signal SYSCLK by outputting a logic high at the non-inverting output of flip-flop 130, and logic lows at the non-inverting outputs of flip-flops 132, 134, and 136. As shown in FIG. 3, this state represents a count of one. Counter 122 continues counting as described above until a count of seven is reached.

Although four flip-flops and four counting positions are shown, the present invention may be implemented with any number of flip-flops and counting positions. As can be seen in FIG. 3, by utilizing n/2 counting positions, when n represents the total number of counts, each counting position transitions from a logic low to a logic high once each n clock cycles. Thus, by utilizing four flip-flops and counting positions, an 8-bit byte clock signal is formed which transitions from a logic low to a logic high each eight clock cycles. Therefore, for example, eight flip-flops could be utilized to form a 16-bit byte clock signal.

In addition, the present invention may also be implemented with a binary counter. Thus, when a binary counter design is utilized, similar results may be obtained by using any number of flip-flops and counting positions.

Referring back to FIG. 2, clock stage 120 also utilizes a delay circuit 124 to align the byte clock signal BCLK to the matching data bit patterns, and to prevent the formation of short byte clock pulses. Delay circuit 124, which is implemented with, among other elements, logical OR gates 150, 152, and 154, and flip-flops 160 and 162, aligns the byte clock signal BCLK and prevents short byte clock pulses by outputting a freeze signal FRZ, a reset signal RST, and a framing signal FRM in response to the matched signal MAT. As described in greater detail below, the framing signal FRM, which is aligned with the byte clock signal BCLK, is utilized to latch the logic states of the last eight outputs of shift register 112.

As shown in FIG. 2, the freeze signal FRZ is output by logical OR gate 150 in response to the matched signal MAT. Thus, the only difference between the leading edge of the matched signal MAT and the leading edge of the freeze signal FRZ is the propagation delay through logical OR gate 150. As a result, the freeze signal FRZ is output at substantially the same time that the matched signal MAT is received.

As further shown in FIG. 2, a hold signal HLD is output from flip-flop 160 to logical OR gates 150 and 152 a first delay time D1 after the matched signal MAT is received, while a first load signal LD1 is output from flip-flop 162 a second delay time D2 later. The hold signal HLD causes logical OR gate 150 to continue to assert the freeze signal FRZ, while causing logical OR gate 152 to output the reset signal RST. The first load signal LD1 causes logical OR gate 154 to output the framing signal FRM and, as described below, also causes logical OR gate 152 to output the reset signal RST when the inverting output of flip-flop 136 is a logic high.

FIGS. 4A–4H show timing diagrams that illustrate the operation of framing circuit 110 when one of the input data bit patterns matches the fixed data bit pattern. As shown in FIGS. 4A–4H, the matched signal MAT is output a propagation delay time DP after the rising edge of the system clock signal SYSCLK when one of the data bit patterns of the input serial bit stream STM matches the fixed data bit pattern.

As further shown in FIGS. 4A–4H, due to the presence of inverter 164 in the system clock path, the hold signal HLD is asserted for one system clock period in response to the first falling edge of the system clock signal SYSCLK that follows the rising edge of the match signal MAT. As a result, the freeze signal FRZ, which has a rising edge substantially coincident with the rising edge of the match signal MAT and a falling edge substantially coincident with the falling edge of the hold signal HLD, is asserted for approximately one and one-half system clock periods.

Referring back to FIG. 2, multiplexer 146 receives the freeze signal FRZ at a select input which causes the inverting output of flip-flop 136 to be fed through multiplexer 146. As a result, due to the inverting output of multiplexer 146, the logic state present at the non-inverting output of flip-flop 136 is continuously present at the input of flip-flop 136 as long as the freeze signal FRZ is asserted. This, in turn, causes the byte clock signal BCLK, which is taken from non-inverting output of flip-flop 136, to be frozen when the freeze signal FRZ is asserted.

The reset signal RST, on the other hand, is received by multiplexers 140, 142, and 144 a propagation delay time after the hold signal HLD is asserted which, in turn, causes a fixed logic high to be selected by multiplexers 140, 142, and 144. Thus, due to the inverting outputs of multiplexers 140, 142, and 144, logic lows are provided to the inputs of flip-flops 130, 132, and 134 in response to the reset signal RST.

As a result, as shown in FIGS. 4A–4H, a 0-0-0-X pattern is loaded into flip-flops 130, 132, 134, and 136, respectively, on the second falling edge of the system clock signal SYSCLK following the assertion of the match signal MAT. The "X" in the 0-0-0-X pattern indicates that the frozen logic state at the non-inverting output of flip-flop 136 can be either a logic high or a logic low.

As further shown in FIGS. 4A–4H, the freeze signal FRZ is deasserted on the second falling edge. As a result, logic lows are presented to the inputs of flip-flops 132, 134, and 136. If the non-inverting output of flip-flop 136 is a logic low, then the logic high output by the inverting output of flip-flop 136 and the logic high of the first load signal LD1 output by flip-flop 160 are logically ANDed together by AND gate 158 to generate a signal which causes logical OR gate 152 to continue to output the reset signal RST.

If, on the other hand, the non-inverting output of flip-flop 136 is a logic high, then the logic high output by the inverting output of flip-flop 134 and the logic high output by the non-inverting output of flip-flop 136 are logically ANDed together by AND gate 156 to generate a signal which also causes logical OR gate 152 to continue to output the reset signal RST. In either case, a 0-0-0-0 pattern will be loaded into flip-flops 130-136 on the third falling edge of the system clock signal SYSCLK. As a result, counter 122 is reset on the third falling edge of the system clock signal SYSCLK that follows the assertion of the match signal MAT.

Referring back to FIGS. 4A–4H, the generation of the matched signal MAT indicates that, during the first system clock period that corresponds to the matched signal MAT, the data which is present at shift register outputs 1–8 matches the fixed data bit pattern. As a result, the data which is present at shift register outputs 2–9 will match the fixed data bit pattern during the second system clock period, while the data which is present at shift register outputs 3–10 will match the fixed data bit pattern during the third system clock period. Thus, on the third falling edge of the system clock signal SYSCLK following the assertion of the match signal MAT, counter 122 is reset at the same time that the matched data is present at shift register outputs 3–10.

The data present at outputs 3–10 are then latched by the falling edge of the framing signal FRM which, as stated above, is output by logical OR gate 154 in response to the first load signal LD1. As a result, the byte clock signal BCLK is reset at the same time that the matched data is latched.

Once aligned, the framing signal FRM is output each time counter 122 reaches a count of seven, i.e., a 0-0-0-1 pattern. This is accomplished, as shown in FIG. 2, by logically NORing the non-inverting output of flip-flop 134 and the inverting output of flip-flop 136, to produce a second load signal LD2 which, in turn, causes the rising edge of framing signal FRM to be asserted each time counter 122 reaches a count of seven.

In addition, rather than letting counter 122 automatically count to zero after each count of seven, logical AND gate 156 insures that a count of zero always follows a count of zero. As stated above, whenever a 0-1 pattern is present at the non-inverting outputs of flip-flops 134 and 136, logical AND gate 156 outputs a signal that causes logical OR gate 152 to output the reset signal RST. Since the non-inverting output of flip-flop 134 is already a logic low, flip-flops 130-136 will each output a logic low at their non-inverting outputs on the falling edge of the next system clock signal SYSCLK.

The advantage to always forcing a count of zero to follow a count of seven is that undefined count values can be removed from the count. Undefined count values, which occur when the logic state output by flip-flops 130 and 132 improperly change logic states as a result of noise or alpha particles, include counts such as 1-1-0-1, and 1-0-0-1. This is the auto-correcting feature of the Johnson counter which is reset to a count of 0-0-0-0 when a count of X-X-0-1 has been observed.

The principle advantage of the present invention is that the byte clock signal BCLK is not reset immediately after receiving an indication that the bit patterns match, but instead is delayed a predetermined delay time to lengthen the byte clock pulse. The length of the byte clock pulse, in turn, is controlled by the duration of the delay of the match signal. Thus, by increasing the delay, the length of the byte clock pulse can be increased even further.

It should be understood that various alternatives to the embodiment of the invention described herein may be employed in practicing the invention. It is intended that the following claims define the scope of the invention and that methods and structures within the scope of these claims and their equivalents be covered thereby.

What is claimed is:

1. A framing circuit for converting a serial data bit stream into a series of parallel data words, the framing circuit comprising:

a comparison stage that identifies a predefined sequence of bits in the serial data bit stream, outputs a match signal when the predefined sequence of bits is identified, and outputs the predefined sequence of bits as a parallel data word a first delay time after the match signal is output; and a counter stage having a count that counts a plurality of system clock periods, outputs a framing clock signal having a period equal to the period of the predefined sequence of bits in response to the count, freezes the framing clock signal in response to a freeze signal, resets the count in response to a reset signal, and restarts the count so that the leading edge of the framing clock signal occurs when the parallel data word output from the comparison stage is valid; and a delay stage that outputs the freeze signal in response to the match signal, and outputs the reset signal a second delay time after the match signal is output.

2. The framing circuit of claim 1 wherein the counter stage resets the comparison clock signal when the count reaches a predefined value.

3. The framing circuit of claim 1 wherein the comparison stage comprises:

a shift register having a plurality of serially-connected storage locations that store and output the logic states of a sequence of bits from the serial data bit stream, the shift register sequentially shifting the logic state of each bit from the serial data bit stream into each of the storage locations in response to a system clock signal;

a template having a plurality of storage locations that store and output the logic states of a plurality of control signals, each storage location in the template having a corresponding storage location in the shift register;

a comparator that compares the logic state output by each storage location in the template to the logic state output by the corresponding storage location in the shift register, and outputs the match signal when the logic state output by each storage location in the template matches the logic state output by the corresponding storage location in the shift register.

4. The framing circuit of claim 3 wherein the shift register includes r storage locations, where r is an integer, wherein the template includes s storage locations, where s is an integer, and wherein r is greater than s.

5. The framing circuit of claim 4 wherein the first delay time is substantially equal to a time required to shift the logic state of a bit into r-s additional storage locations.

6. The framing circuit of claim 5 wherein the clock stage includes:

a counter stage having a count that counts a plurality of system clock periods, outputs the framing clock signal in response to the count, freezes the framing clock signal in response to a freeze signal, resets the count in response to a reset signal, and restarts the count so that the leading edge of the framing clock signal occurs when the parallel data word output from the comparison stage is valid; and a delay stage that outputs the freeze signal in response to the match signal, and outputs the reset signal a second delay time after the match signal is output.

7. A method for converting the data in a serial data bit stream into a series of parallel data words, the method comprising the steps of:

identifying a predefined sequence of bits in the serial data bit stream;

outputting a match signal when the predefined sequence of bits is identified;

outputting the predefined sequence of bits as a parallel data word a first delay time after the match signal is output;

counting a plurality of system clock periods to form a count;

outputting a framing clock signal having a period equal to the period of the predefined sequence of bits in response to the count;

freezing the framing clock signal in response to a freeze signal;

outputting the freeze signal in response to the match signal;

resetting the count in response to a reset signal; and outputting the reset signal a second delay time after the match signal is output.

* * * * *